(12) United States Patent
Felts

(10) Patent No.: US 6,795,505 B2
(45) Date of Patent: Sep. 21, 2004

(54) ENCODING METHOD FOR THE COMPRESSION OF A VIDEO SEQUENCE

(75) Inventor: Boris Felts, Marseilles (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 742 days.

(21) Appl. No.: 09/858,015

(22) Filed: May 15, 2001

(65) Prior Publication Data

US 2002/0006164 A1 Jan. 17, 2002

(30) Foreign Application Priority Data

May 18, 2000 (EP) ............................................ 00401366

(51) Int. Cl.[7] .............................................. H04N 7/12
(52) U.S. Cl. ............................................... 375/240.19
(58) Field of Search ................... 375/240.19, 240.03, 375/240.05, 240.11, 240.24, 240.18; 348/398.1, 395.1, 397.1, 408.1, 438.1; 382/240, 128, 232

(56) References Cited

U.S. PATENT DOCUMENTS 6,359,928 B1 * 3/2002 Wang et al. ............ 375/240.05
6,674,911 B1 * 1/2004 Pearlman et al. ........... 382/240

FOREIGN PATENT DOCUMENTS

EP          004012167    5/2000
WO          WO9819274    10/1997 ............. G06T/9/40

OTHER PUBLICATIONS

Beong–Jo Kim, An Embedded Wavelet Video coder using three–dimensional set partitioning in hierarchical trees, 1997, IEEE.*
Amir Said, "A New, Fast, and Efficient Image Codec Based on Set Partitioning in Hierarchical Trees", Jun. 1996, pp 243–250.

* cited by examiner

Primary Examiner—Chris Kelley
Assistant Examiner—Behrooz Senfi

(57) ABSTRACT

The invention relates to an encoding method for the compression of a video sequence including successive frames organized in groups of frames. Each frame is decomposed by means of a three-dimensional (3D) wavelet transform leading to a given number of successive resolution levels. This method is based on the SPIHT algorithm that transforms the original set of picture elements (pixels) of each group of frames into transform coefficients constituting a hierarchical pyramid in which a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defines the spatio-temporal relationship. According to the invention, a full exploration of the subbands is performed during the initialization step of the process, and the set significance level of each subtree in the root pixels is calculated and stored. In the sorting step for the process, a comparison between said set significance level and the current significance level n replaces the call to the function that computes the significance of a tree relatively to n.

2 Claims, 2 Drawing Sheets

ENCODING METHOD FOR THE COMPRESSION OF A VIDEO SEQUENCE

FIELD OF THE INVENTION

The present invention first relates to an encoding method for the compression of a video sequence including successive frames organized in groups of frames, each frame being decomposed by means of a three-dimensional (3D) wavelet transform leading to a given number of successive resolution levels, said encoding method being based on the hierarchical subband encoding process called "set partitioning in hierarchical trees" (SPIHT) and leading from the original set of picture elements (pixels) of each group of frames to wavelet transform coefficients encoded with a binary format and constituting a hierarchical pyramid, said coefficients (i,j) being organized into a spatio-temporal orientation tree rooted in the lowest frequency (or approximation subband) resulting from the 3D wavelet transform and completed by an offspring in the higher frequency subbands, the coefficients of said tree being ordered into partitioning sets involving the pixels and corresponding to respective levels of significance, said sets being defined by means of magnitude tests leading to a classification of the significance information in three ordered lists called list of insignificant sets (LIS), list of insignificant pixels (LIP) and list of significant pixels (LSP), said tests being carried out in order to divide said original set of pixels into said partitioning sets according to a division process that continues until each significant coefficient is encoded within said binary representation, and said spatio-temporal orientation tree defining the spatio-temporal relationship inside said hierarchical pyramid.

The invention also relates to an encoding method for the compression of a video sequence including successive frames organized in groups of frames, each frame being decomposed by means of a three-dimensional (3D) wavelet transform leading to a given number of successive resolution levels, said encoding method being based on a hierarchical subband encoding process leading from the original set of picture elements (pixels) of each group of frames to wavelet transform coefficients constituting a hierarchical pyramid, a spatio-temporal orientation tree-in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, said subbands being scanned one after the other in an order that respects the parent-offspring dependencies formed in said spatio-temporal tree, and flags "off/on" being added to each coefficient (i,j) of said spatio-temporal tree in view of a progressive transmission of the most significant bits of the coefficients and in such a manner that at least one of them describes the state of a set of pixels and at least another one describes the state of a single pixel.

BACKGROUND OF THE INVENTION

The expansion of multimedia applications is now making the scalability one of the most important functionalities of video compression schemes. Scalability allows delivering multiple levels of quality or spatial resolutions/frame rates in an embedded bitstream towards receivers with different requirements and encoding capabilities. Current standards like MPEG-4 have implemented scalability in a predictive DCT-based framework through additional high-cost layers. More efficient solutions based on a three-dimensional wavelet decomposition followed by a hierarchical encoding of the spatio-temporal trees like the Set Partitioning In Hierarchical Trees algorithm (SPIHT) have been recently proposed as an extension of still image coding techniques (the original SPIHT algorithm is described for instance in "A new, fast, and efficient image codec based on set partitioning in hierarchical trees", by A. Said and W. A. Pearlman, IEEE Transactions on Circuits and Systems for Video Technology, vol. 6, n°3, June 1996, pp. 243–250, and the extension of this algorithm to the 3D case is described for instance in "An embedded wavelet video coder using three-dimensional set partitioning in hierarchical trees (SPIHT)", B. J. Kim and W. A. Pearlman, Proceedings of Data Compression Conference, Mar. 25–27, 1997, Snowbird, Utah, USA, pp.251–260). The 3D wavelet decomposition provides a natural spatial resolution and frame rate scalability, while the in-depth scanning of the obtained coefficients in the hierarchical trees and the bitplane encoding lead to the desired quality scalability with a high compression ratio.

The SPIHT algorithm is based on a key concept: a partial sorting of the coefficients according to a decreasing magnitude, and the prediction of the absence of significant information across scales of the wavelet decomposition by exploiting self-similarity inherent in natural images. This means that if a coefficient is insignificant at the lowest scale of the wavelet decomposition, the coefficients corresponding to the same area at the other scales have a high probability to be insignificant too. Basically, the SPIHT is an iterative algorithm that consists in comparing a set of pixels corresponding to the same image area at different resolutions with a value called "level of significance" from the maximal significance level found in the spatio-temporal decomposition tree down to 0. For a given level, or bitplane, two passes are carried out: the sorting pass, which looks for zero-trees or sub-trees and sorts insignificant and significant coefficients, and the refinement pass, which sends the precision bits of the significant coefficients. The SPIHT algorithm examines the wavelet coefficients from the highest level of the decomposition to the lowest one. This corresponds to first considering the coefficients corresponding to important details located in the smallest scale subbands, with increasing resolution, then examining the smallest coefficients, which correspond to fine details. This justifies the "hierarchical" designation of the algorithm: the bits are sent by decreasing importance of the details they represent, and a progressive bitstream is thus formed.

A tree structure, called spatial (or spatio-temporal in the 3D case) orientation tree, defines the spatial (or spatio-temporal) relationship inside the hierarchical pyramid of wavelet coefficients. The roots of the trees are formed with the pixels of the approximation subband at the lowest resolution ("root" subband), while the pixels of the higher subbands corresponding to the image area (to the image volume, in the 3D case) defined by the root pixel form the offspring of this pixel. In the 3D version of the SPIHT algorithm, each pixel of any subband but the leaves has 8 offspring pixels, and each pixel has only one parent. There is one exception at this rule: in the root case, one pixel out of 8 has no offspring. The following notations describe the parent-offspring relationship, an illustration of these dependencies being given in FIG. 1 (three-dimensional case) where the notations are the following: TF=temporal frame, TAS=temporal approximation subband, CFTS=coefficients in the spatio-temporal approximation subbands (or root coefficients), TDS.LRL=temporal detail subband at the last resolution level of the decomposition, and TDS.HR=temporal detail subband at higher resolution:

O(x,y,z): set of coordinates of the direct offspring of the node (x,y,z);

D(x,y,z): set of coordinates of all descendants of the node (x,y,z);

H(x,y,z): set of coordinates of all spatio-temporal orientation tree roots (nodes in the highest pyramid level: spatio-temporal approximation subband);

$$L(x,y,z)=D(x,y,z)-O(x,y,z).$$

The SPIHT algorithm makes use of three lists: the LIS (list of insignificant sets), the LIP (list of insignificant pixels), and the LSP (list of significant pixels). In all these lists, each entry is identified by a coordinate (x,y,z). In the LIP and LIS, (x,y,z) represents a unique coefficient, while in the LIS it represents a set of coefficients D(x,y,z) or L(x,y,z), which are sub-trees of the spatio-temporal tree. To differentiate between them, the LIS entry is of type A if it represents D(x,y,z), and of type B if it represents L(x,y,z). During the first pass (sorting pass), all the pixels of the LIP are tested and those that become significant are moved to the list LSP. Similarly, the sets of the LIS that become significant are removed from the list LIS and split into subsets that are placed at the end of the LIS and will be each examined in turn. The LSP contains the list of significant pixels to be "refined": the $n^{th}$ bit of the coefficient is sent if this one is significant with respect to the level n.

The SPIHT approach is designed to provide quality scalability associated with a high compression ratio. However, scalability in temporal or spatial resolutions cannot be obtained with this coding strategy without modifications. To improve the global compression rate of the video coding system, it is usually advised to add an arithmetic encoder to the zero-tree encoding module.

To make the arithmetic coding efficient, it is very important to capture all the information that may have some influence on the current pixel and particularly the information related to neighbouring pixels. This information is represented by its context. The in-depth search performed when scanning for zero-trees does not exploit the redundancy inside subbands and makes harder the determination of a relevant context for the arithmetic coding. The manipulation of the lists LIS, LIP, LSP conducted by a set of logical conditions makes the order of pixel scanning hardly predictable. The pixels belonging to the same 3D offspring tree but coming from different spatio-temporal subbands are encoded and put one after the other in the lists, which has for effect to mix the pixels of foreign subbands. Thus, the geographic interdependencies between pixels of the same subband are lost. Moreover, since the spatio-temporal subbands result from temporal or spatial filtering, the frames are filtered along privileged axes that give the orientation of the details. This orientation dependency is also lost when the SPIHT algorithm is applied, because the scanning does not respect the geographic order.

It has then been proposed, in a previous european patent application filed on May 3, 2000, by the applicant under the number 00401216.7, a new strategy for encoding the spatio-temporal wavelet coefficients, inspired from the 3D-SPIHT, but which allows a better context selection while allowing to obtain a spatial or temporal resolution scalability in the coding scheme. According to said previous patent application, the proposed algorithm scans the subbands one after the other in an order that respects the parent-offspring relationships formed in the spatio-temporal tree, and flags off/on are added to each coefficient of the spatio-temporal tree, in order to constitute, in view of a progressive transmission of the most significant bits of the coefficients, three virtual magnitude-ordered lists LIS, LIP and LSP. These flags are such that at least one of them describes the state of a set of pixels and at least another one describes the state of a single pixel.

By using this technique, the initial subband structure of the 3D wavelet transform is preserved, and the flag added to each coefficient indicates to which list LIS, LIP or LSP this coefficient belongs. However, when using said modified SPIHT algorithm, most of the computation time is spent for the determination of the significance level of a set of pixels: all the spatio-temporal trees or subtrees are indeed examined as many times as they are insignificant relatively to the given level of significance, and the same costly operation is repeated for each level.

SUMMARY OF THE INVENTION

It is therefore an object of the invention to propose a less costly encoding method, with a reduced computation time.

To this end, the invention relates to a method such as defined in the introductory part of the description and which is moreover characterized in that, according to the algorithm indicated in the appendix A:

(a) starting by the pixels in the highest subbands and finishing by those belonging to the lowest ones, a full exploration of the subbands is performed during the initialization step of the process, and the set significance level SSL of each subtree of said tree in the root pixels is calculated and stored, according to the following procedure:

if the coefficient (i,j) has no child, SSL(i,j)=−1;

else SSL(i,j)=max {PSL(k,l), SSL(k,l)};

(with k and l∈O(i,j), the offspring corresponding to the coefficient (i,j), and PSL is the pixel significance level given by:

$$PSL(i,j)=\text{floor}(\log_2 \times (i,j)),$$

(b) in the sorting step of the process, a comparison between SSL(i,j) and the current significance level n replaces the call to the function that computes the significance of a tree relatively to n:

if SSL(i,j)<n, the subtree whose the root is (i,j) is insignificant relatively to n, else, the subtree is significant.

In a slightly distinct embodiment of the invention, the invention also relates to a method such as defined in the introductory part and which is moreover characterized in that, according to the algorithm indicated in the appendix B:

(a) starting by the pixels in the highest subbands and finishing by those belonging to the lowest ones, a full exploration of the subbands is performed during the initialization step of the process, the set significance level SSL of each subtree of said tree in the root pixels is calculated, and a flag is used to store for each coefficient the value of the corresponding set significance level SSL, according to the following procedure:

if the coefficient (i,j) has no child, SSL(i,j)=−1;

else SSL(i,j)=max {PSL(k,l), SSL(k,l)};

(with k and l∈O(i,j), the offspring corresponding to the coefficient (i,j), and PSL is the pixel significance level given by:

$$PSL(i,j)=\text{floor}(\log 2|\times(i,j)|),$$

(b) in the sorting step of the process, a comparison between SSL(i,j) and the current significance level n replaces the call to the function that computes the significance of a tree relatively to n:

if SSL(i,j)<n, the subtree whose the root is (i,j) is insignificant relatively to n, else, the subtree is significant.

Whatever its implementation, this improved method, that may be applied to any coding algorithm based on the determination of zero-trees, highly reduces the computation time of the main loop of the algorithm. An increase in memory size is observed, but is relatively small.

BRIEF DESCRIPTION OF THE DRAWINGS

The present invention will now be described, with reference to the accompanying drawings in which.

DETAILED DESCRIPTION OF THE INVENTION

According to the SPIHT algorithm, and also to the encoding method described in the european patent application hereinabove mentioned where the scanning of the lists LIS, LIP, LSP is replaced by a subband scanning and a flag interpretation, a full exploration of the subbands is performed during the initialization to determine the maximum significance level. It is then here proposed to take advantage of this full exploration to calculate and store the significance level of each subtree in the root pixels.

Figure 1:
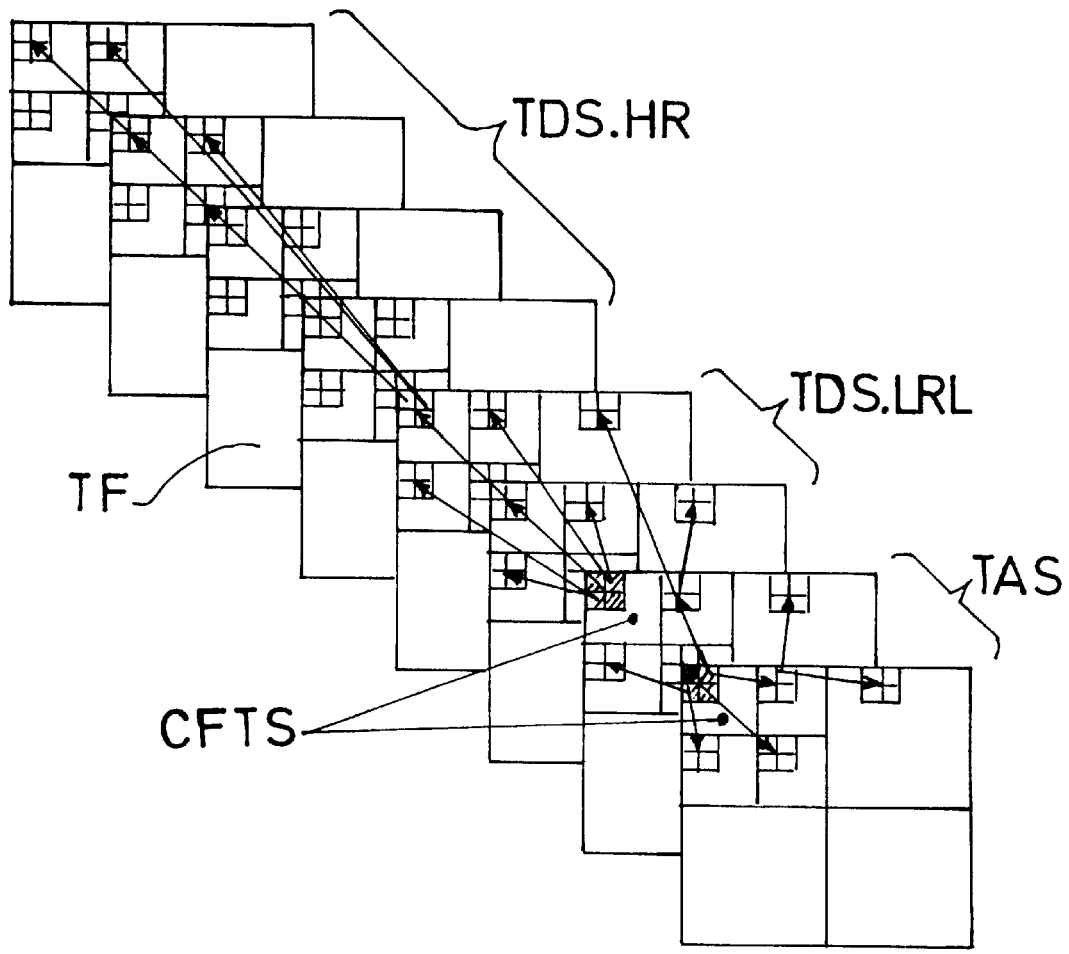
FIG. 1 shows examples of parent-offspring dependencies in the spatio-temporal tree, in the 3D case.
Figure 2:
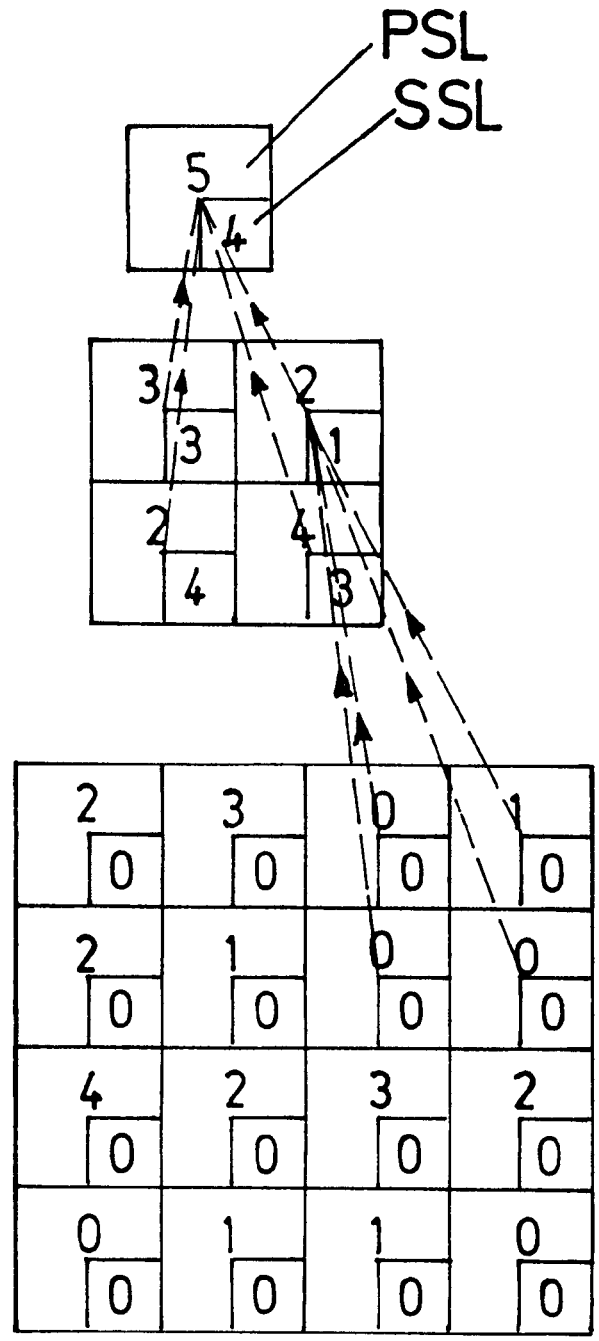
FIG. 2 illustrates in the 2-D case an example of calculation of the set significance level.

On the basis of the parent-offspring relationship defined in the first cited document, a flag such as provided in the cited european patent application is used to store the value of the corresponding set significance level—called SSL—in the following manner. Starting by the pixels in the highest subbands and finishing by those belonging to the lowest ones (this order respects the parent-offspring relationship), the operations are the following:

if the coefficient (i,j) has no child, SSL(i,j)=−1;
else SSL(i,j)=max{PSL(k,l), SSL(k,l)};

(with k and l∈O(i,j), the offspring corresponding to the coefficient (i,j), and PSL is the pixel significance level given by:

$$PSL(i,j)=\text{floor}(\log_2|x(i,j)|),$$

floor(.) designating the nearest integer value lower than the expression between the brackets). An example of calculation of the SSL stored in each coefficient is shown in FIG. 2 in the 2D case.

In the core loop of the original SPIHT algorithm or in that of the encoding method described in the European patent application, the comparison between SSL(i,j) and the current significance level n replaces the call to the function that computes the significance of a tree relatively to n:

if SSL(i,j)<n, the subtree whose the root is (i,j) is insignificant relatively to n, else, the subtree is significant.

As an illustration, the algorithms in Appendix A and B show the modifications in the original SPIHT and the flag-based method respectively. However, such a determination and storage of the SSL is not restricted to these two algorithms, but can be applied to a wide class of methods using the subtree dependencies to code efficiently the wavelet coefficients.

This method highly reduces the computation time of the main loop of the SPIHT algorithm and flag-based method since the determination of the significance of a set rests on a simple comparison. The computation time spent during the initialization is not increased because the determination of the SSL is used to calculate the maximum significance level. An increase in memory size required for the SSL storage is observed, but is relatively small.

APPENDIX A

3D SPIHT algorithm including SSL comparisons.
1. Initialization:
Compute the SSL in the whole spatio-temporal tree.
Output n=max{PSL(x,y,z), SSL(x,y,z), (x,y,z)∈H}.
Set the LSP as an empty list, and add the coordinates (x,y,z)∈H to the LIP, and only those with descendants also to the LIS, as type A entries.
2. Sorting pass:
2.1 For each entry (x, y, z) in the LIP do:
    if (PSL(x,y,z)≧n),
    output 1;
    move (x, y, z) to the LSP;
    output sign(x, y, z);
    else output 0;
2.2. For each entry (x, y, z) in the LIS do:
2.2.1. if the entry is of type A then:
    if (SSL(x,y,z)≧n)
    output 1
    for each (x',y',z')∈O(x,y,z),
    if (SSL(x',y',z')≧n),
    output 1;
    move (x',y',z') to the end of LSP;
    output sign(x',y',z');
    else output 0;
    else
    output 0
    move (x',y',z') to the end of the LIP;
    if L(x,y,z)≠∅ then move (x,y,z) to the end of the LIS as an entry of type B, and go to step 2.2.2 else remove entry from the LIS;
2.2.2. if the entry is of type B then
    if (max{SSL(x',y',z'), (x',y',z')∈O(x,y,z)}≧n),
    output 1;
    add each (x',y',z')∈O(x,y,z) to the end of the LIS as an entry of type A;
    remove (x,y,z) from the LIS.
    else output 0;
3. Refinement pass:
For each entry (x, y, z,) in the LSP, except those included in the last sorting pass (i.e., with the same n), output the nth most significant bit of C(x,y,z);
4. Quantization-step:
    decrement n by 1;
    go to step 2.

APPENDIX B 3D flag method including SSL comparisons.
1. Initialization:
Compute SSL in the whole spatio-temporal tree.
Output sig_level_max=max{PSL(x,y,z), SSL(x,y,z), (x,y,z)∈H}.
Put flag FP4 to all the coordinates (x,y,z)∈H, and flag FS1 only to those with descendants.

2. Main loop:
From the bitplane n=sig_level_max down to bitplane n=0:
From the lowest to the highest subband resolution, in a predetermined and fixed scanning order (defined in the european patent under the number 00401216.7:
a) set significance
  1) if flag FS1 is on, then:
    if (SSL(x,y,z)≧n), then:
      Output 1
      For each (x',y',z')∈O(x,y,z), put flag FP4;
      Remove flag FS1 from (x,y,z);
      If L(x,y,z)≠∅, then put flag FS2.
    else output 0.
  2) if flag FS2 is on, then:
    if (max{SSL(x',y',z'), (x',y',z')∈O(x,y,z)} ≧n), then:
      Output 1;
      For each (x',y',z')∈O(x,y,z), put flag FS1;
      Remove flag FS2 from (x,y,z);
    else output 0;
b) pixel significance:
  1) if flag FP3 is on, then output=the nth bit of (x,y,z).
  2) if flag FP4 is on, then:
    if (PSL(x,y,z)≧n), then:
      Output 1;
      Put flag FP3 on;
      Output sign (x,y,z);
      Remove flag FP4.
    else output 0.

What is claimed is:

1. An encoding method for the compression of a video sequence including successive frames organized in groups of frames, each frame being decomposed by means of a three-dimensional (3D) wavelet transform leading to a given number of successive resolution levels, said encoding method being based on the hierarchical subband encoding process called "set partitioning in hierarchical trees" (SPIHT) and leading from the original set of picture elements (pixels) of each group of frames to wavelet transform coefficients encoded with a binary format and constituting a hierarchical pyramid, said coefficients (i,j) being organized into a spatio-temporal orientation tree rooted in the lowest frequency (or approximation subband) resulting from the 3D wavelet transform and completed by an offspring in the higher frequency subbands, the coefficients of said tree being ordered into partitioning sets involving the pixels and corresponding to respective levels of significance, said sets being defined by means of magnitude tests leading to a classification of the significance information in three ordered lists called list of insignificant sets (LIS), list of insignificant pixels (LIP) and list of significant pixels (LSP), said tests being carried out in order to divide said original set of pixels into said partitioning sets according to a division process that continues until each significant coefficient is encoded within said binary representation, and said spatio-temporal orientation tree defining the spatio-temporal relationship inside said hierarchical pyramid, said method being further characterized in that, according to the algorithm indicated in the appendix A:

(a) starting by the pixels in the highest subbands and finishing by those belonging to the lowest ones, a full exploration of the subbands is performed during the initialization step of the process, and the set significance level SSL of each subtree of said tree in the root pixels is calculated and stored, according to the following procedure:
  if the coefficient (i,j) has no child, SSL(i,j)=−1;
  else SSL(i,j)=max {PSL(k,l), SSL(k,l)};
(with k and l∈O(i,j), the offspring corresponding to the coefficient (i,j), and PSL is the pixel significance level given by:

$$PSL(i,j)=\text{floor}(\log_2 \times (i,j)),$$

(b) in the sorting step of the process, a comparison between SSL(i,j) and the current significance level n replaces the call to the function that computes the significance of a tree relatively to n:
  if SSL(i,j)<n, the subtree whose the root is (i,j) is insignificant relatively to n, else, the subtree is significant.

2. An encoding method for the compression of a video sequence including successive frames organized in groups of frames, each frame being decomposed by means of a three-dimensional (3D) wavelet transform leading to a given number of successive resolution levels, said encoding method being based on a hierarchical subband encoding process leading from the original set of picture elements (pixels) of each group of frames to wavelet transform coefficients constituting a hierarchical pyramid, a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, said subbands being scanned one after the other in an order that respects the parent-offspring dependencies formed in said spatio-temporal tree, and flags "off/on" being added to each coefficient (i,j) of said spatio-temporal tree in view of a progressive transmission of the most significant bits of the coefficients and in such a manner that at least one of them describes the state of a set of pixels and at least another one describes the state of a single pixel, said method being further characterized in that, according to the algorithm indicated in the appendix B:

(a) starting by the pixels in the highest subbands and finishing by those belonging to the lowest ones, a full exploration of the subbands is performed during the initialization step of the process, the set significance level SSL of each subtree of said tree in the root pixels is calculated, and a flag is used to store for each coefficient the value of the corresponding set significance level SSL, according to the following procedure:
  if the coefficient (i,j) has no child, SSL(i,j)=−1;
  else SSL(i,j)=max {PSL(k,l), SSL(k,l)};
(with k and l∈O(i,j), the offspring corresponding to the coefficient (i,j), and PSL is the pixel significance level given by:

$$PSL(i,j)=\text{floor}(\log_2 \times (i,j)),$$

(b) in the sorting step of the process, a comparison between SSL(i,j) and the current significance level n replaces the call to the function that computes the significance of a tree relatively to n:
  if SSL(i,j)<n, the subtree whose the root is (i,j) is insignificant relatively to n, else, the subtree is significant.

* * * * *